United States Patent
Lee et al.

(10) Patent No.: US 11,838,873 B2
(45) Date of Patent: Dec. 5, 2023

(54) ALTITUDE-AWARE ENERGY SAVING METHODS AND APPARATUSES

(71) Applicant: Nokia Technologies Oy, Espoo (FI)

(72) Inventors: Gilsoo Lee, Naperville, IL (US); Rapeepat Ratasuk, Inverness, IL (US); Tzu-Chung Hsieh, Hoffman Estates, IL (US); Shahzada Basharat Rasool, Ashburn, VA (US); Athul Prasad, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 12 days.

(21) Appl. No.: 17/231,767

(22) Filed: Apr. 15, 2021

(65) Prior Publication Data
US 2022/0338128 A1    Oct. 20, 2022

(51) Int. Cl.
H04W 52/24    (2009.01)
H04W 52/14    (2009.01)
H04W 52/26    (2009.01)

(52) U.S. Cl.
CPC ....... H04W 52/242 (2013.01); H04W 52/146 (2013.01); H04W 52/267 (2013.01)

(58) Field of Classification Search
CPC ............ H04W 52/242; H04W 52/146; H04W 52/267; H04W 52/283; B64D 27/26; B64D 27/22
See application file for complete search history.

(56) References Cited

U.S. PATENT DOCUMENTS

| 10,312,993 | B2 | 6/2019 | Rupasinghe et al. | |
|---|---|---|---|---|
| 2012/0021403 | A1* | 1/2012 | Laderoute | C12N 15/86 435/5 |
| 2012/0051403 | A1* | 3/2012 | Jung | H04W 84/047 375/211 |
| 2014/0048646 | A1 | 2/2014 | Devaul et al. | |
| 2015/0072690 | A1* | 3/2015 | Kim | H04W 52/242 455/437 |
| 2016/0293016 | A1* | 10/2016 | Rein-Weston | G05D 1/0005 |
| 2017/0118688 | A1 | 4/2017 | Guvenc | |
| 2017/0141860 | A1* | 5/2017 | Furuichi | H04W 52/245 |
| 2020/0244349 | A1 | 7/2020 | Speidel et al. | |

(Continued)

FOREIGN PATENT DOCUMENTS

| EP | 1 406 398 A1 | 4/2004 | |
|---|---|---|---|
| GB | 2506150 A * | 3/2014 | ........ H04W 28/0236 |

(Continued)

OTHER PUBLICATIONS

Invitation to Pay Additional Fees received for corresponding Patent Cooperation Treaty Application No. PCT/EP2022/058961, dated Jul. 29, 2022, 10 pages.

(Continued)

*Primary Examiner* — John J Lee
(74) *Attorney, Agent, or Firm* — SQUIRE PATTON BOGGS (US) LLP

(57) ABSTRACT

Systems, methods, apparatuses, and computer program products for altitude-aware energy saving. The method may include receiving, from a network element, information including a coupling loss change or a reduced transmit power command. The method may also include controlling an uplink transmission based on the received information.

12 Claims, 9 Drawing Sheets

(56) References Cited

U.S. PATENT DOCUMENTS

2020/0288407 A1    9/2020    Kalhan et al.
2022/0007302 A1*    1/2022    Lin ..................... H04W 52/383

FOREIGN PATENT DOCUMENTS

| GB | 2506150 A | 3/2014 |
|---|---|---|
| WO | 02/054622 A1 | 7/2002 |
| WO | 02/069525 A1 | 9/2002 |
| WO | 2018/231160 A2 | 12/2018 |
| WO | 2020/112111 A1 | 6/2020 |
| WO | 2020/199903 A1 | 10/2020 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.4.0, Mar. 2021, pp. 1-1087.

"3rd Generation Partnership Project; Technical Specification Group Radio Access Network; NR;Radio Resource Control (RRC) protocol specification(Release 16)", 3GPP TS 38.331, V16.3.1, Jan. 2021, pp. 1-932.

"3rd Generation Partnership Project; Technical Specification Group Radio Access Network; NR;Physical layer procedures for control(Release 16)", 3GPP TS 38.213, V16.4.0, Dec. 2020, pp. 1-181.

Kim et al., "Leveraging Dynamic Spare Capacity in Wireless Systems to Conserve Mobile Terminals' Energy", IEEE/ACM Transactions on Networking, vol. 18, No. 3, Jun. 2010, pp. 802-815.

Becvar et al., "Reducing Energy Consumed by Repositioning ofFlying Base Stations Serving Mobile Users", IEEE Wireless Communications and Networking Conference (WCNC), May 25-28, 2020, 7 pages.

Dinh et al., "Optimal Energy Allocation Policy for WirelessNetworks in the Sky", IEEE International Conference on Communications (ICC), Jun. 8-12, 2015, pp. 3204-3209.

International Search Report and Written Opinion issued in corresponding International Application No. PCT/EP2022/058961 dated Oct. 7, 2022.

Georgia E. Athanasiadou et al., "Path Loss Characteristics for UAV-to-Ground Wireless Channels", 13th European Conference on Antennas and Propagation (EuCAP 2019), 4 pages.

* cited by examiner

ALTITUDE-AWARE ENERGY SAVING METHODS AND APPARATUSES

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for altitude-aware energy saving.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include receiving, from a network element, information comprising a coupling loss change or a reduced transmit power command. The method may also include controlling an uplink transmission based on the received information.

Other example embodiments may be directed to an apparatus. The apparatus may include at least one processor and at least one memory including computer program code. The at least one memory and computer program code may also be configured to, with the at least one processor, cause the apparatus at least to receive, from a network element, information comprising a coupling loss change or a reduced transmit power command. The apparatus may also be caused to control an uplink transmission based on the received information.

Other example embodiments may be directed to an apparatus. The apparatus may include means for measuring, at the apparatus, a radio altimeter signal. The apparatus may also include means for receiving, from a network element, information comprising a coupling loss change or a reduced transmit power command. The apparatus may also include means for controlling an uplink transmission based on the received information.

In accordance with other example embodiments, a non-transitory computer readable medium may be encoded with instructions that may, when executed in hardware, perform a method. The method may include receiving, from a network element, information comprising a coupling loss change or a reduced transmit power command. The method may also include controlling an uplink transmission based on the received information.

Other example embodiments may be directed to a computer program product that performs a method. The method may include receiving, from a user equipment, a report comprising status information. The method may also include determining a transmit timing and a transmit power based on the report to achieve a target data rate.

Other example embodiments may be directed to an apparatus that may include circuitry configured to receive, from a network element, information comprising a coupling loss change or a reduced transmit power command. The apparatus may also include circuitry configured to control an uplink transmission based on the received information.

Certain example embodiments may be directed to a method. The method may include receiving, from a user equipment, a report comprising status information. The method may also include determining a transmit timing and a transmit power based on the report to achieve a current data rate. The method may further include controlling a downlink transmission based on the transmit timing and the transmit power.

Other example embodiments may be directed to an apparatus. The apparatus may include at least one processor and at least one memory including computer program code. The at least one memory and computer program code may be configured to, with the at least one processor, cause the apparatus at least to receive, from a user equipment, a report comprising status information. The apparatus may also be caused to determine a transmit timing and a transmit power based on the report to achieve a current data rate. The apparatus may further be caused to control a downlink transmission based on the transmit timing and the transmit power.

Other example embodiments may be directed to an apparatus. The apparatus may include means for receiving, from a user equipment, a report comprising status information. The apparatus may also include means for determining a transmit timing and a transmit power based on the report to achieve a current data rate. The apparatus may further include means for controlling a downlink transmission based on the transmit timing and the transmit power.

In accordance with other example embodiments, a non-transitory computer readable medium may be encoded with instructions that may, when executed in hardware, perform a method. The method may include receiving, from a user equipment, a report comprising status information. The method may also include determining a transmit timing and a transmit power based on the report to achieve a current data rate. The method may further include controlling a downlink transmission based on the transmit timing and the transmit power.

Other example embodiments may be directed to a computer program product that performs a method. The method may include receiving, from a user equipment, a report comprising status information. The method may also include determining a transmit timing and a transmit power based on the report to achieve a current data rate. The method may further include controlling a downlink transmission based on the transmit timing and the transmit power.

Other example embodiments may be directed to an apparatus that may include circuitry configured to receive, from a user equipment, a report comprising status information. The apparatus may also include circuitry configured to determine a transmit timing and a transmit power based on the report to achieve a current data rate. The apparatus may further include circuitry configured to control a downlink transmission based on the transmit timing and the transmit power.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for altitude-aware energy saving.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Figure 1:
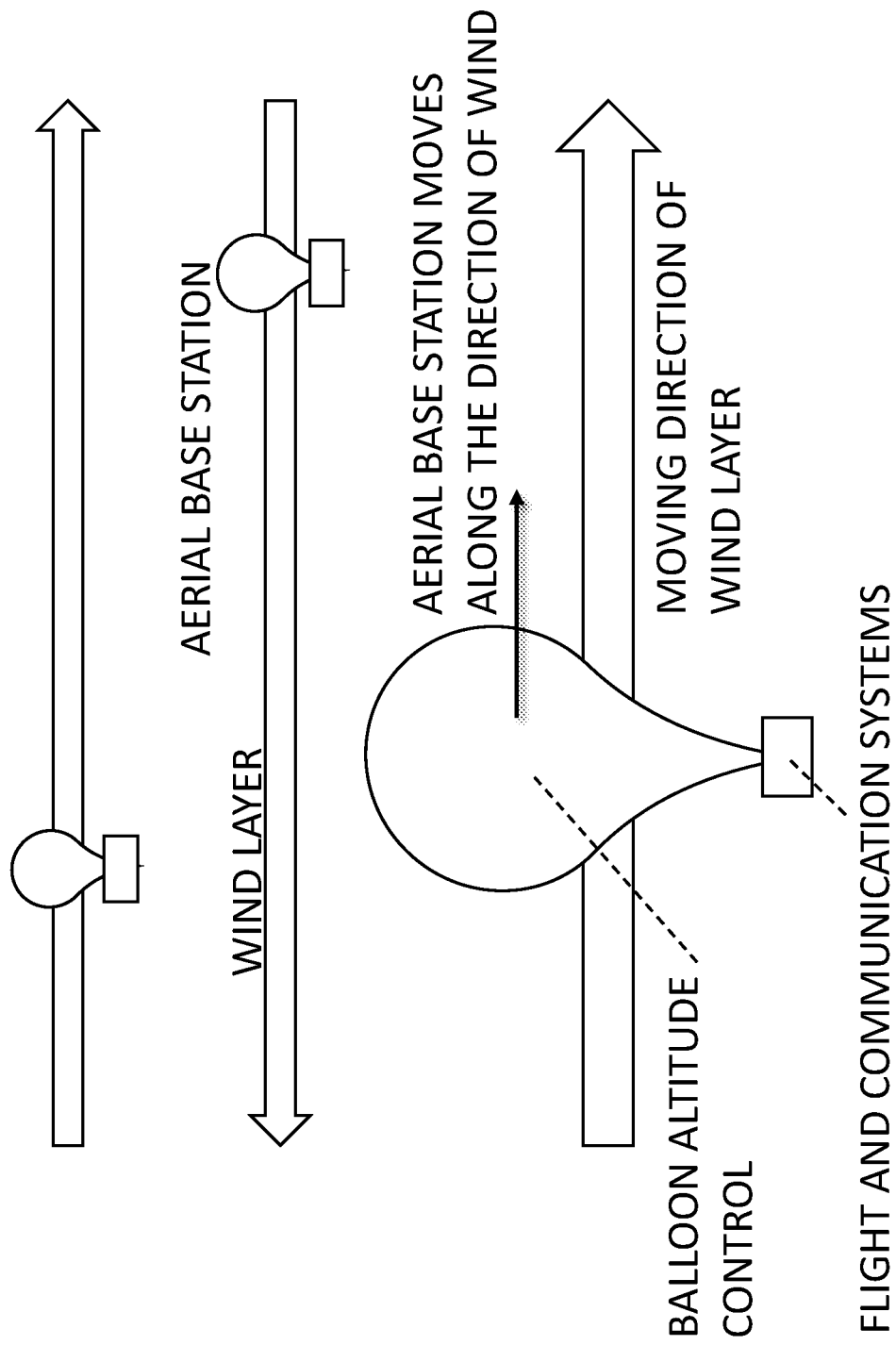
FIG. 1 illustrates an example balloon-type base station (BS) that changes flight direction with altitude adjustment.

FIG. 1 illustrates an example balloon-type base station (BS) that changes flight direction with altitude adjustment. In particular, FIG. 1 illustrates a balloon-type BS that changes the moving direction by adjusting the altitude, and uses wind directions at different altitudes. Deploying aerial BSs has been considered to overcome the coverage limitation of terrestrial network. User equipment (UEs) located outside of the terrestrial network's coverage may be served by the aerial BSs deployed in remote areas such as oceans, mountains, and deserts. Further, in emergency and disaster scenarios, when the terrestrial network is disabled, the aerial BSs may be deployed as a non-terrestrial network (NTN) to provide connectivity in the disaster-stricken area.

Balloon-type BSs have been developed as a type of the aerial BS. Balloon-type BSs have benefits including, for example, long flight durations of about 3 to 4 months, and the ability to carry a payload weighing about 10 kg for electronic equipment. Therefore, balloon-type BSs may be used to deploy NTN services.

As illustrated in FIG. 1, balloon-type BSs may constantly move with the winds in an area. Balloon-type BS may also have the ability to adjust the altitude, find winds that will carry it horizontally (e.g., latitudinally and/or longitudinally) to a desired horizontal location. Therefore, flight control systems of balloon-type BSs may have the capability of adjusting the altitude to change the trajectory of the BS.

Figure 2:
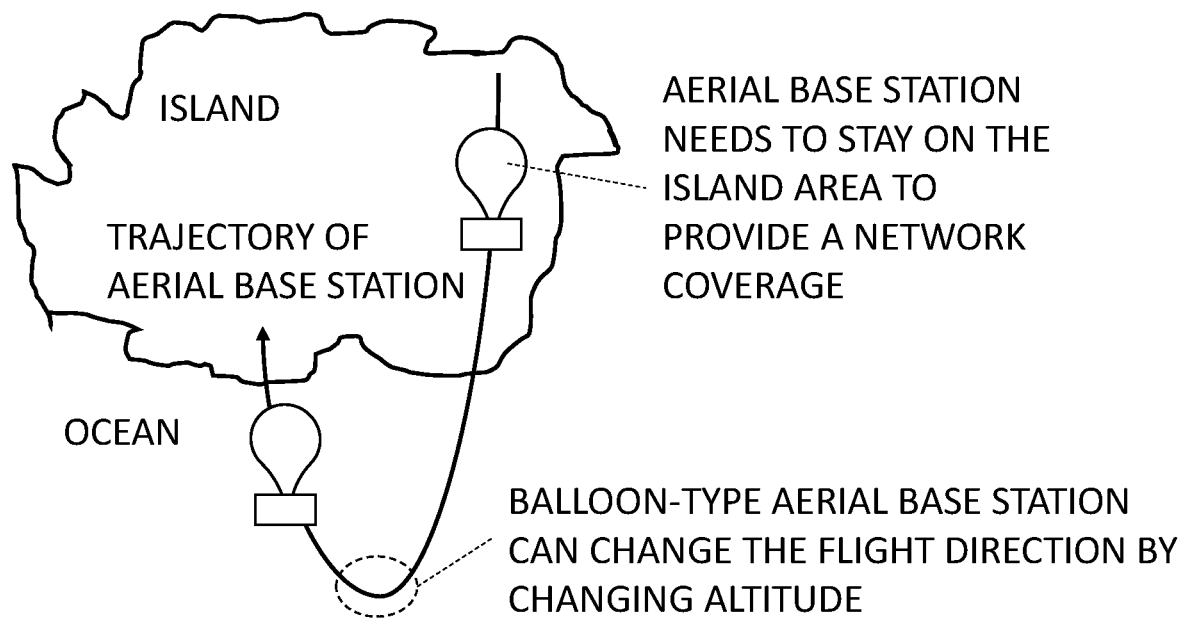
FIG. 2 illustrates an example of a deployed BS trajectory around a geographical area.

To deploy a balloon-type BS to provide a coverage in a region, the altitude may need to be adjusted. In particular, the balloon-type BS may have a large coverage of about 80 km in diameter while a flight altitude range is from about 17 km to about 25 km. However, the BS may be constantly moving due to wind. Therefore, altitude may need to be constantly updated in order to locate the BS at a service area. For instance, FIG. 2 illustrates an example of a deployed BS trajectory around a geographical area. In particular, FIG. 2 illustrates changes in the BS's trajectory to maintain the service coverage area on an island. Therefore, when the BS is deployed to provide coverage to the same area for emergency communications, the altitude of the BS may be frequently adjusted according to wind directions.

As discussed above, future aerial BSs may be used to provide service for a remote area. To exploit the advantages of the aerial BSs, a number of challenges need to be addressed. For instance, the energy consumption should be reduced to extend the operation time and improve the reliability of the aerial BSs. The aerial BS platform may be relying on a renewable energy source such as solar energy. However, due to the limited energy storage capacity, relying on renewable energy sources can incur abrupt energy shortage. In addition, when solar energy is used to power the aerial BS, harvested solar energy is stored in the battery during the daytime, and the stored energy is used during the night-time. However, the availability of harvesting renewable energy has uncertainty. For instance, harvesting renewable energy may be highly dependent on certain environmental factors such as daytime duration and sunlight intensity. As such, it may be challenging to sufficiently procure the power to operate the aerial BS. Therefore, by reducing energy consumption, it may be possible to efficiently use the harvested energy, while preventing service interruption and improving reliability in operating aerial BSs.

In the terrestrial network, when a BS is located at a fixed location, total energy consumption may be reduced by using transmit power control. For example, mobile terminals may back-off their uplink transmit power in order to extend battery lifetimes. As a trade-off, however, the transmission time period may be extended. While the location of UE and BS may be stationary, certain example embodiments may consider scenarios where the distance between the UE and BS is dynamically changing over time due to the altitude changes of the aerial BSs. Therefore, certain example embodiments may provide new energy saving methods applicable to the balloon-type aerial BSs, as well as relay nodes, repeaters, High-Altitude Platforms Stations (HAPSs) such as light-weight aircrafts, and commercial aircrafts with air-to-ground connectivity, and/or the like. Although balloon-type aerial BSs may be discussed herein, in other example embodiments, relay nodes, repeaters, HAPSs, and commercial aircrafts, and/or the like may be used in place of, or in addition to, balloon-type aerial BSs.

Certain example embodiments may provide a method for energy saving for balloon-type BSs (e.g., aerial platform in the stratosphere). In particular, for a balloon-type aerial BS, altitude change may be needed for flight control (i.e., change the trajectory or traveling route). For instance, in certain example embodiments, altitude change for flight control may be used to save energy consumption on communication systems. According to certain example embodiments, a navigation system may determine trajectory including a decision on altitude changes, and, therefore, the current and future altitude may be seen as given information. Then, the given altitude information may be used to develop a set of altitude-aware energy saving components.

In certain example embodiments, when a balloon-type aerial BS changes altitude, coupling loss or path loss between the BS and UE may vary. Thus, certain example embodiments may focus on the case where coupling loss is reduced if the BS is in a descending state. In that case, the energy-saving components may be designed to enable the UE and BS to reduce the transmit power in uplink and downlink, respectively.

According to certain example embodiments, when the BS is moving downward, the current measurement of coupling loss may become outdated in the future. Thus, to compensate for the coupling loss change in UL power control, the BS may calculate the altitude impact to the coupling loss change by using the given information on altitude adjustment. The calculated coupling loss change may be sent to UE so that a fractional power control parameter may be adjusted to lower the transmit power.

In certain example embodiments, by delaying transmission when the BS's altitude is descending, coupling loss may be reduced at the time of transmission. Therefore, according to certain example embodiments, a transmitter may use a low transmit power while achieving the same data rate. In addition, certain example embodiments may introduce a delayed transmission procedure in uplink (UL) and downlink (DL), respectively. In the UL case, the BS may give the UE the information of either the coupling loss change or the reduced transmit power associated with a transmit timing. As a result, the UE may receive the information from the BS to control the transmit power.

According to certain example embodiments, by delaying transmission when the BS's altitude is descending, coupling loss may be reduced at the time of transmission. Therefore, in certain example embodiments, a transmitter may use a low transmit power while achieving the same data rate. Additionally, certain example embodiments introduce a delayed transmission procedure in UL and DL, respectively. For instance, in the UL case, the BS may give the UE the information of either the coupling loss change or the reduced transmit power associated with a transmit timing. As a result, the UE may receive the information from the BS to control the transmit power.

According to certain example embodiments, the delayed transmission may also be applied in DL. For instance, in DL, the UE may report the maximum allowed delay and other information such as application type to the BS. The BS may use the UE's report and the flight information to estimate the future coupling losses at different altitudes. In certain example embodiments, the flight information may include both (1) altitude information (e.g., current altitude and estimated future altitude) and (2) trajectory information (i.e., the scheduled traveling path/route of the BS). In other example embodiments, the flight information may be obtained from a separate source (e.g., operations support system (OSS) or other navigation control system). Then, the BS may decide the transmit timing and power level in DL.

As noted above, certain example embodiments may provide energy-saving components that are applicable when a balloon-type aerial BS changes altitude. For instance, in NTN, coupling loss between the BS and the UE may be a function of the BS's antenna, altitude, elevation angle, and clutter loss. Thus, when the BS moves, the values of altitude, elevation angle, and cluster loss may be updated, which changes the coupling loss value. By focusing on the scenarios where the coupling loss is reduced, the UE and BS may save the energy consumption in UL and DL, respectively.

According to certain example embodiments, for energy saving in UL, the UE may reduce the transmit power when the BS is in a descending state. In certain example embodiments, a fractional power control in UL may be modified. In particular, the fractional power control in UL may be modified to consider the impact of altitude change and potential reduction in DL power of the BS. The original fractional power control may assume that the BS is stationary and has constant DL power levels, at least for the reference signals used in measurements. However, when the BS is moving downward, the path loss may be reduced. Thus, the impact of altitude change may be compensated in the original fractional power control procedure. However, when the BS also reduces the DL transmit power in accordance with reduced BS altitude, the traditional power control in this scenario may result in higher UL UE power.

Figure 3:
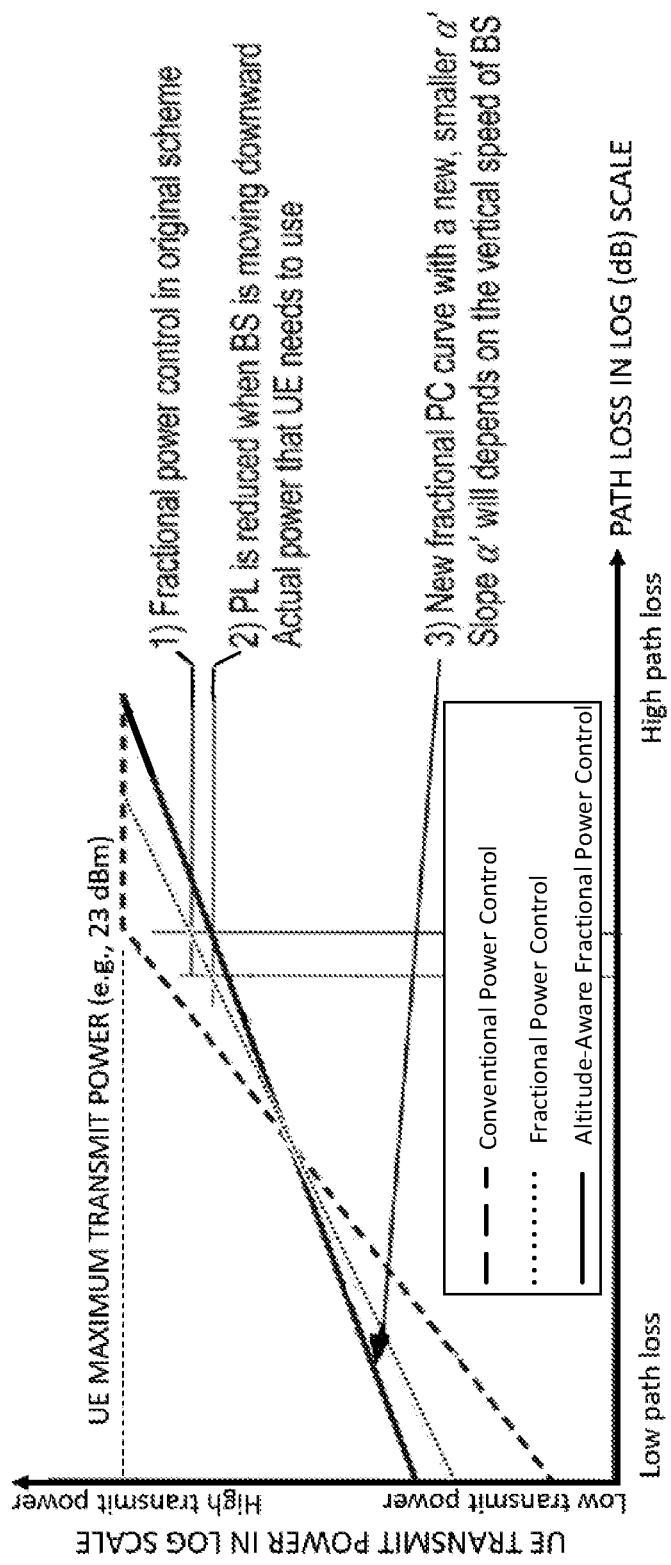
FIG. 3 illustrates an example altitude-aware transmit power control in physical uplink shared channel (PUSCH), according to certain example embodiments.

FIG. 3 illustrates an example altitude-aware transmit power control in physical uplink shared channel (PUSCH), according to certain example embodiments. However, in other example embodiments, the updated power control method may be applied to other physical uplink channels including, for example, physical uplink control channel (PUCCH) and sounding reference signal (SRS). According to some example embodiments, in PUSCH power control, the power control and fractional power control may be applied. The transmit power in PUSCH may be defined as:

$$P_{PUSCH,b,f,c} = \min(P_{CMAX,f,c}, P_{o_{PUSCH},b,f,c} + 10 \log(2^{\mu} M_{RB,b,f,c}) + \alpha_{b,f,c} PL_{b,f,c} + \Delta_{TF,b,f,c} + f_{b,f,c})$$

where PL is the path loss, and $\alpha$ is a parameter used to reduce interference at the cell edge and improve spectral efficiency as for fractional power control (PC). According to certain example embodiments, in fractional PC, $\alpha$ may be set to a certain value less than one. Thus, according to certain example embodiments, fractional PC may enable the UE to reduce the Tx power, when compared to the conventional PC. For example, in FIG. 3, the dashed line is the original PC, and another dashed line is the fractional PC. FIG. 3 illustrates that using $\alpha$ may change the slope of the fractional PC. Then, as the path loss increases, the Tx power of the fractional PC may be lower than the Tx power of the original PC. If the BS is moving, a current path loss measurement may become outdated at a later time as illustrated in FIG. 1. In this case, the coupling loss estimation based on the path loss measurement may also become inaccurate. Therefore, the altitude impact to the coupling loss may be compensated by controlling a parameter in the equation. For instance, if the BS is in the descending state, a can be reduced as $\alpha'=\alpha-\delta$ where $\delta$ is a power reduction rate defined as a function of BS's mobility parameters. By reducing $\alpha$, the UE may decide to use a reduced transmit power that compensates the coupling loss change. According to certain example embodiments, any parameter in the above equation including a may be adjusted in a similar way to compensate the transmit power mismatch due to coupling loss change.

In certain example embodiments, the value of $\alpha'$ may be decided by either the BS or UE. For instance, if the BS makes a decision on the power reduction (i.e., $\alpha'$), the BS may calculate the coupling loss change. To calculate the coupling loss change, the BS may estimate the current elevation angle and clutter loss. According to certain example embodiments, the elevation angle may be estimated from the UE's timing advance (TA) and clutter loss from the UE's measurement report. Then, based on the information of current elevation angle and coupling loss, the BS estimates the coupling loss at the future altitude. In certain example embodiments, the UE's measurement report may include measurement information on reference signals such as RSRP. Further, in some example embodiments, this measurement may differ from the report including the maximum allowed delay and the maximum delay period used for delayed transmission.

According to certain example embodiments, after the BS knows the coupling loss changes, the BS may perform UL power control. In certain example embodiments, if the transmit power is decided by a closed loop control, the BS may instruct the user to reduce the transmit power after the initial access. In this case, the power control command may be directly used to adjust the UE transmit power when the BS knows how much power should be changed based on the change of altitude and the coupling loss change. The UE may receive the power control command from the BS and adjust the transmit power in UL transmission accordingly.

According to certain example embodiments, in the closed loop control, the BS may issue the power control command to the user. To reduce the overhead of the power control command from the BS to UE, the BS may initially calculate the coupling loss change and determine the power reduction rate denoted by $\delta$. This information may be sent from the BS to the UE when the BS starts to change the altitude via RRC signaling. Then, during the altitude-changing period, the UE may use an open loop power control to decide the transmit power by using the power reduction rate from the BS. In this case, the BS may periodically update the power reduction rate since it can dynamically change over time. However, if altitude changes marginally, the BS may update the power reduction parameter with a long-term period. In addition, with an open-loop power control, after the UE initially receives the power reduction rate from the BS, it may be possible for UE to adjust the initial power reduction rate based on the information on the estimated coupling loss from the received signal measurement.

Figure 4:
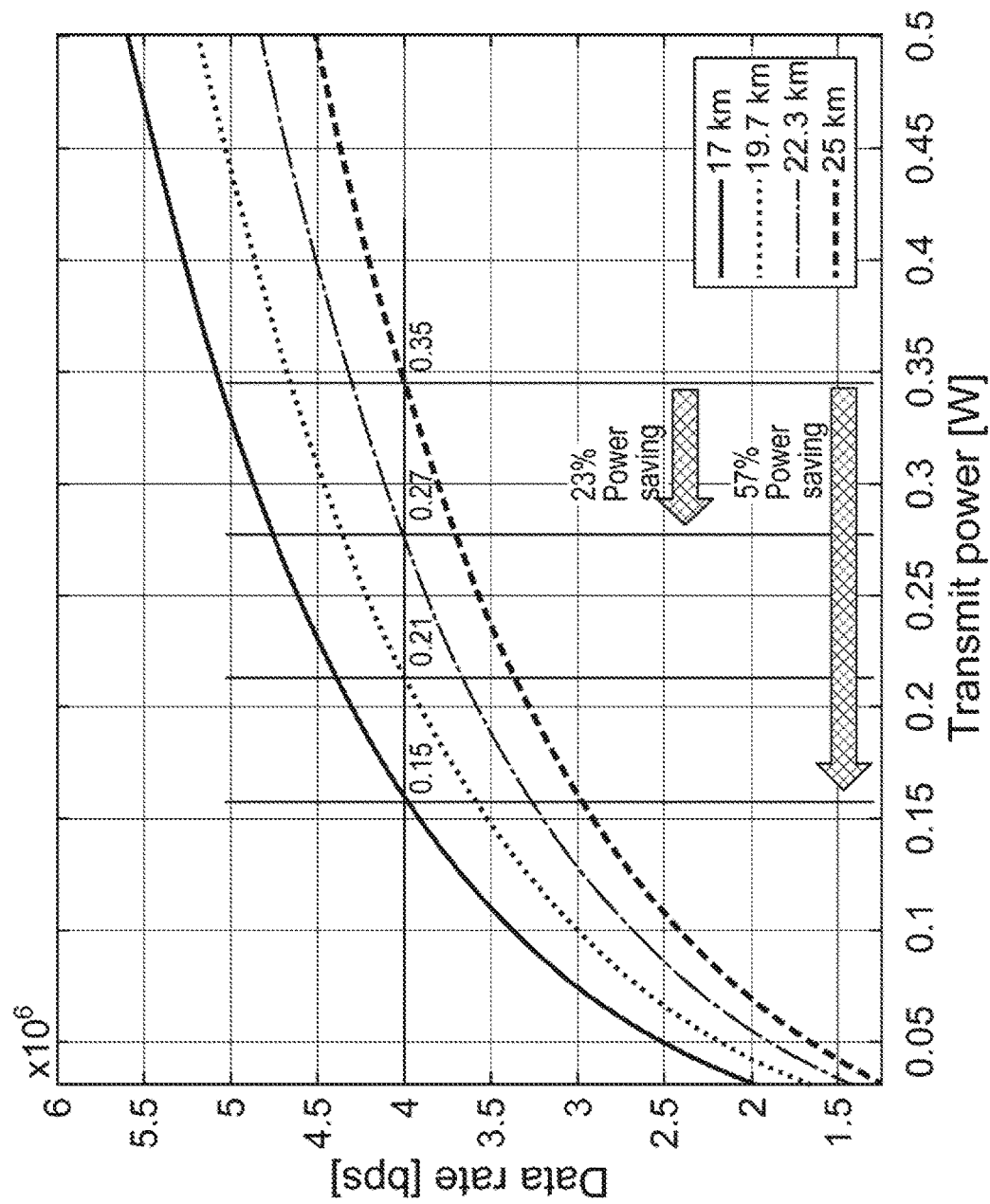
FIG. 4 illustrates an example of power saving, according to certain example embodiments.

FIG. 4 illustrates an example of power saving, according to certain example embodiments. Certain example embodiments may provide further energy consumption savings in UL when the UE adopts a delayed transmission scheme. In particular, when an aerial BS is moving downward, the coupling loss is decreasing. In that case, if transmission is delayed, the same data rate can be achieved by using a low transmit power due to the reduced path loss. FIG. 4 shows an example of such transmit power saving. For instance, in FIG. 4, if the altitude changes from 25 km to 22.3 km by delaying a transmission, a transmit power can be reduced by 23% while maintaining the same data rate.

Figure 5:
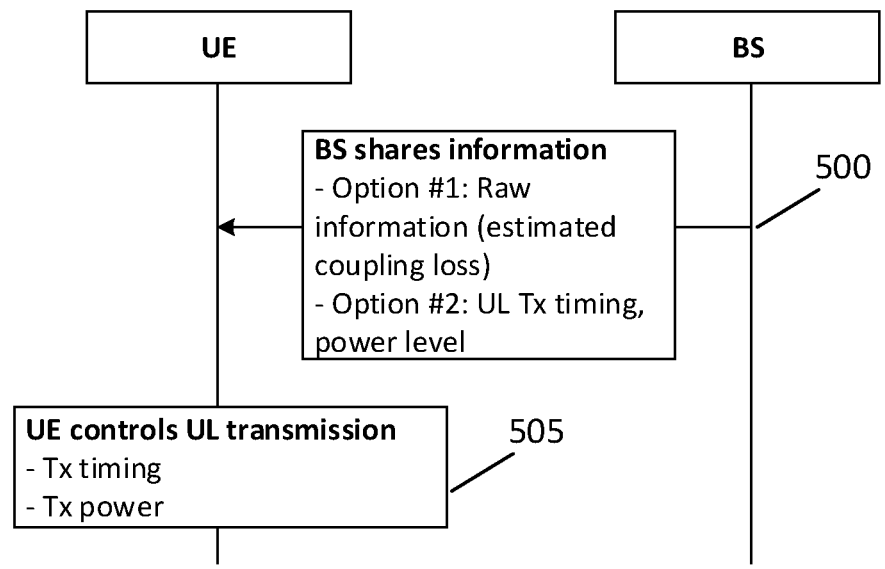
FIG. 5 illustrates an example of information sharing from the BS to the UE, according to certain example embodiments.

FIG. 5 illustrates an example of information sharing from the BS to the UE, according to certain example embodiments. In particular, FIG. 5 shows delayed transmission in uplink from the BS to UE. At 500, the BS may, as a first option, send to the UE the estimated coupling losses at different altitude values through RRC signaling. After that, at 505, the UE may calculate the transmit power levels to achieve a target data rate (i.e., a current data rate) with the different coupling loss values. At 505, the UE may also select the transmit timing and power for UL transmission, while considering the type and maximum allowed delay of the application running on UE. In other example embodiments, at 500, as a second option, the BS may calculate one or multiple pairs of the transmit timing and transmit power, and send them to UE. This option may be used to save computing power of UE, and the information from the BS may be directly used by UE for UL transmission.

According to certain example embodiments, DL energy saving may be provided. For example, in DL, the BS may reduce the DL power for reference signals (SSB/CSI-RS) when altitude varies significantly. For instance, the BS may choose the DL transmit power in such a way that the UE's received power stays constant at a given point on the ground regardless of the altitude of the BS. In that case, due to the DL energy saving mechanism, the traditional power control may not correctly work as it may incorrectly assume that the path loss has stayed constant, and, thus, the UE may keep the older higher transmit power. However, the UL energy saving mechanism in certain example embodiments may overcome this problem as the BS's feedback to the UE for power control may take into account the reduced altitude and potential reduction in DL BS power.

Figure 6:
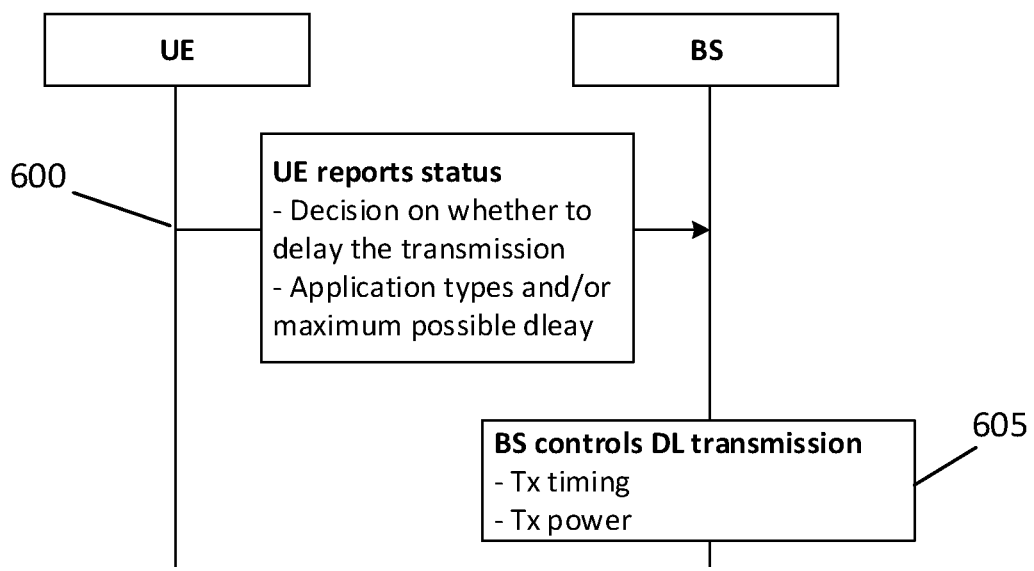
FIG. 6 illustrates an example of information sharing from the UE to the BS, according to certain example embodiments.

FIG. 6 illustrates an example of information sharing from the UE to the BS, according to certain example embodiments. In particular, FIG. 6 illustrates a delayed transmission in DL, according to certain example embodiments. According to some example embodiments, when the BS changes the power as altitude changes, energy consumption may be further reduced by adopting delayed transmission in DL. As noted above, FIG. 6 shows the information sharing from UE to the BS. At 600, the UE may first report the information for delayed transmission by using a DL request in Msg3. The information in the request message may include: (i) whether delayed transmission is selected; (ii) application types; and (iii) maximum allowed delay.

According to certain example embodiments, with regard to whether delayed transmission is selected, the UE may select not to use an option of delayed transmission if the UE prioritizes performance over energy saving. According to other example embodiments, with regard to application types, the information on the current application type may be used by the BS to decide whether delayed transmission is used or not. When the UE is running multiple applications, the status information may include an indicator to mark the current application type. For example, a one-bit indicator may be used to mark whether the application is delay tolerant or delay sensitive. In other example embodiments, with regard to the maximum allowed delay, the maximum delay period may be useful information. When delayed transmission is used, the delay period may not exceed the maximum delay period reported by the UE.

At 605, after the UE sends the information, the BS may determine the transmit timing and power. The BS may need to know the relationship between data rate and transmit power for different altitudes, as shown in FIG. 4. According to certain example embodiments, to determine the required transmit power at the current altitude, the BS may first estimate the UE's clutter loss and elevation angle from the measurement report and TA. For instance, the BS may estimate the UE's elevation angle by using its current altitude, and estimate the round-trip time from the TA value. With the elevation angle, the BS may calculate the free space path loss and estimate the UE's clutter loss from the UE's reported reference signal received power (RSRP). Therefore, the elevation angle and clutter loss may be used to calculate the current coupling loss, and estimate the transmit power required to achieve a target data rate. In certain example embodiments, when the BS's altitude changes, the elevation angle and cluster loss may be estimated for different altitudes by combining the flight information. The BS may then decide the transmit timing by considering the maximum delay reported by the UE. Once the transmit timing is decided, the altitude at the decided transmit time and the required transmit power may be determined.

Figure 7:
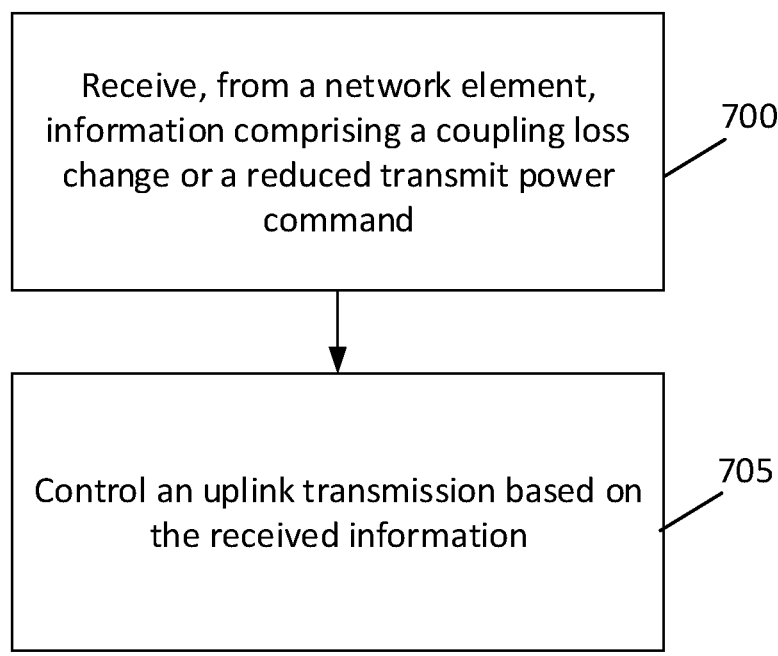
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 7 may be performed by a UE, for instance, similar to apparatus 10 illustrated in FIG. 9(*a*).

According to certain example embodiments, the method of FIG. 7 may include, at 700, receiving, from a network element, information including a coupling loss change or a reduced transmit power command. The method may also include, at 705, controlling an uplink transmission based on the received information.

According to certain example embodiments, during the controlling, the method may also include calculating, based on the coupling loss change, a transmit power level to achieve a current data rate in the uplink transmission, adjusting transmit power in the uplink transmission based on the calculated transmit power level to maintain the current data rate, and adjusting a transmit timing for the uplink transmission. According to some example embodiments, during the controlling, the method may further include adjusting transmit power in the uplink transmission based on the reduced transmit power command associated with the transmit timing. According to other example embodiments, the method may also include receiving a signal measurement from the network element, and adjusting an initial power reduction rate of the uplink transmission by estimating a path loss based on the received signal measurement. In certain example embodiments, the method may further include transmitting to the network element a report including information of whether a delayed transmission is selected, an application type, and a maximum allowed delay.

Figure 8:
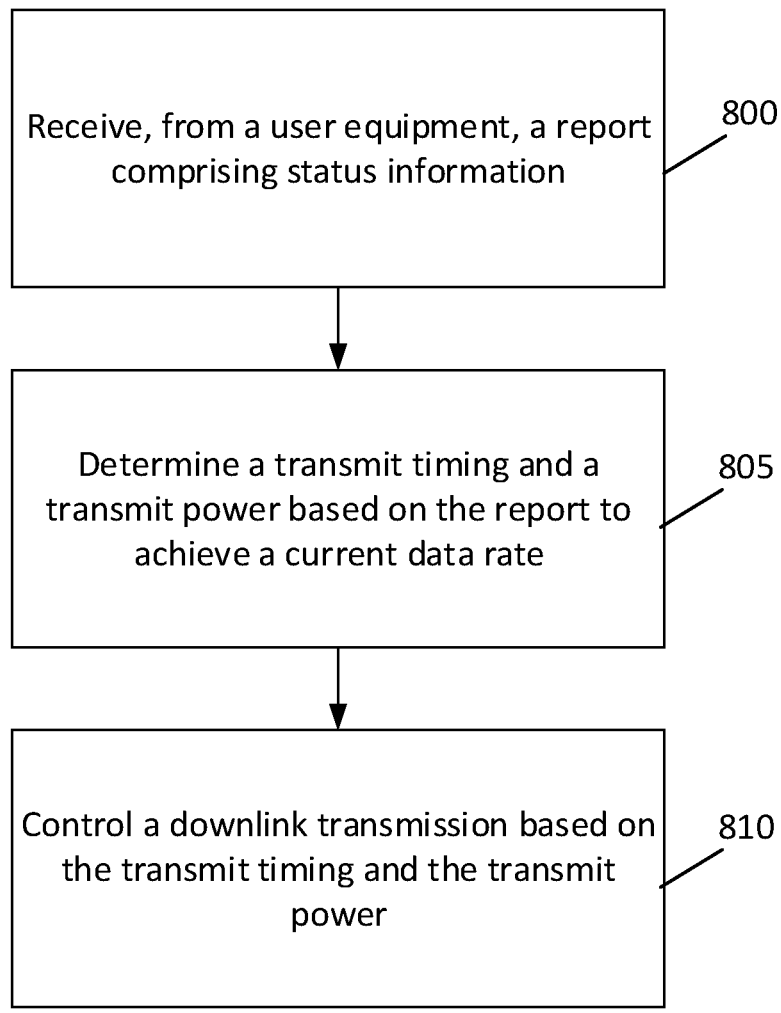
FIG. 8 an example flow diagram of another method, according to certain example embodiments.

FIG. 8 illustrates an example flow diagram of another method, according to certain example embodiments. In an example embodiment, the method of FIG. 8 may be performed by a network entity, network node, or a group of multiple network elements in a 3GPP system, such as LTE or 5G-NR. For instance, in an example embodiment, the method of FIG. 8 may be performed by a BS, for instance, similar to apparatus 20 illustrated in FIG. 9(*b*).

According to certain example embodiments, the method of FIG. 8 may include, at 800, receiving, from a user equipment, a report including status information. At 805, the method may include determining a transmit timing and a transmit power based on the report to achieve a current data rate. At 810, the method may include controlling a downlink transmission based on the transmit timing and the transmit power.

According to certain example embodiments, the status information may include whether delayed transmission is selected by the user equipment, an application type used by the user equipment, and a maximum allowed delay reported by the user equipment. According to other example embodiments, in determining the transmit power, the method may also include estimating, based on the report and a timing advance value of the user equipment, a clutter loss and an elevation angle of the user equipment, and calculating a coupling loss change based on the clutter loss and the elevation angle. According to some example embodiments, in determining the transmit time, the method may also include considering the maximum allowed delay reported by the user equipment. In certain example embodiments, the method may further include estimating future coupling losses at different altitudes of the apparatus based on the report and flight information of the apparatus.

Figure 9A:
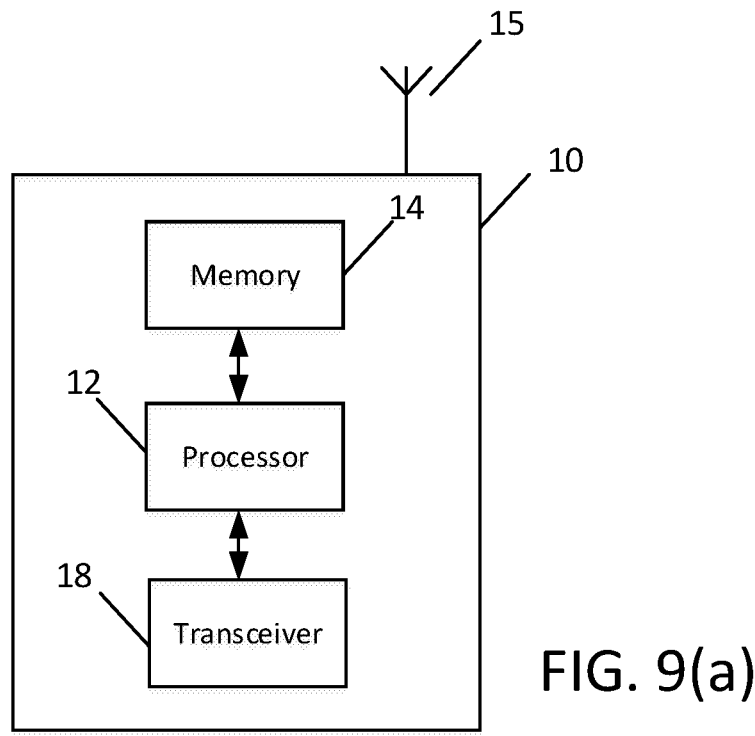
FIG. 9(a) illustrates an apparatus, according to certain example embodiments.
Figure 9B:
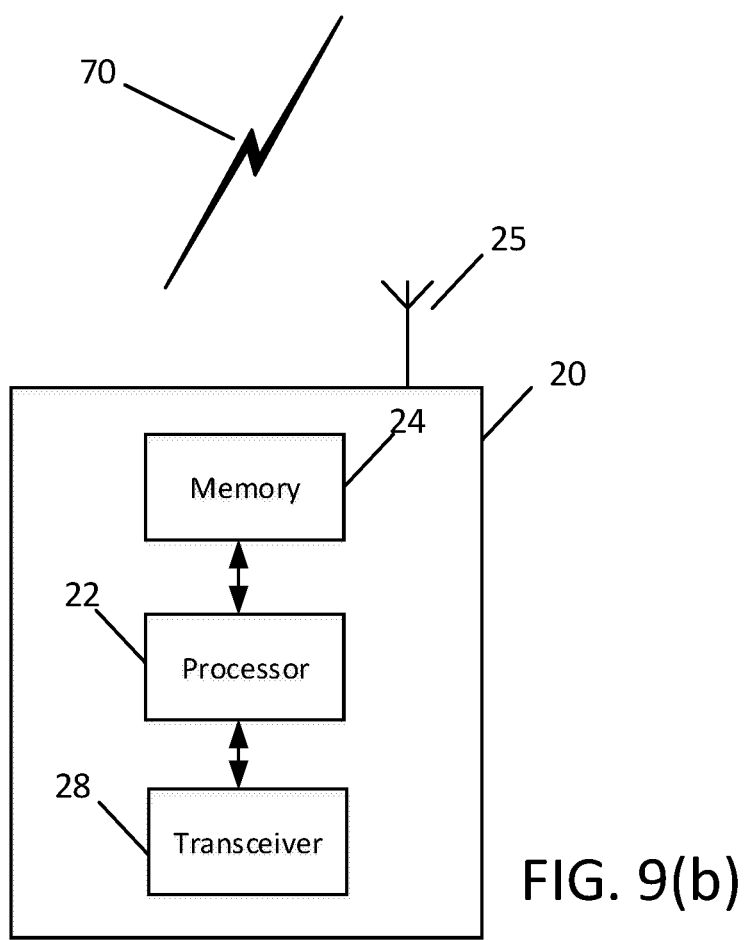
FIG. 9(b) illustrates another apparatus, according to certain example embodiments.

FIG. 9(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 7(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, eMTC, NB-IoT, Bluetooth, NFC, MulteFire, and/or any other radio access technologies. It should be noted that one of ordinary skill in the art would understand that apparatus 10 may include components or features not shown in FIG. 9(*a*).

As illustrated in the example of FIG. 9(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive, from a network element, information including a coupling loss change or a reduced transmit power command. The apparatus may also be controlled by memory 14 and processor 12 to control an uplink transmission based on the received information.

FIG. 9(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, BS, and/or WLAN access point, associated with a radio access network (RAN), such as an LTE network, 5G or NR. It should be noted that one of ordinary skill in the art would understand that apparatus 20 may include components or features not shown in FIG. 9(*b*).

As illustrated in the example of FIG. 9(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6 and 8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6 and 8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, eMTC, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to receive, from a user equipment, a report including status information. Apparatus 20 may also be controlled by memory 24 and processor 22 to determine a transmit timing and a transmit power based on the report to achieve a current data rate. Apparatus 20 may further be controlled by memory 24 and processor 22 to control a downlink transmission based on the transmit timing and the transmit power.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations Certain example embodiments may be directed to an apparatus that includes means for performing any of the methods described herein including, for example, means for receiving, from a network element, information including a coupling loss change or a reduced transmit power command. The apparatus may also include means for controlling an uplink transmission based on the received information.

Other example embodiments may be directed to an apparatus that includes means for receiving, from a user equipment, a report including status information. The apparatus may also include means for determining a transmit timing and a transmit power based on the report to achieve a current data rate. The apparatus may further include means for controlling a downlink transmission based on the transmit timing and the transmit power.

Certain example embodiments described herein provide several technical improvements, enhancements, and/or advantages. In some example embodiments, it may be possible to reduce energy consumption when operating an aerial BS, and efficiently use harvested energy while preventing service interruption and improving reliability in operating the aerial BS. Certain example embodiments may also provide an energy saving method that is applicable to balloon-type aerial BSs where the distance between the UE and the BSs dynamically change over time due to altitude changes of the aerial BSs. According to other example embodiments, it may be possible for the UE and BS to save energy consumption in UL and DL, respectively.

While certain example embodiments may focus on a "balloon-type" aerial BS, other example embodiments may be applicable to other types of aerial BSs including, for example, "fixed-wing" BS since altitude change may similarly be observed in the case of a fixed-wing BS. In some example embodiments, a fixed-wing BS may be seen as a BS built/mounted on a fixed-wing unmanned aerial vehicle (UAV) or HAPS systems. Additionally, when the coupling loss is decreasing, certain example embodiments may reduce the Tx power for energy saving. In this case, due to the lowered Tx power, interference may also be reduced. Furthermore, according to other example embodiments, by saving energy consumption, the usage of the energy storage system in the aerial BS platform may be reduced, thus expanding the lifespan of the battery.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary | |
|---|---|
| 3GPP | 3rd Generation Partnership Project |
| 5G | 5th Generation |
| 5GCN | 5G Core Network |
| BS | Base Station |
| CSI-RS | Channel State Information-Reference Signal |
| DCI | Downlink control Information |
| DL | Downlink |
| eNB | Enhanced Node B |
| gNB | 5G or Next Generation NodeB |
| LTE | Long Term Evolution |
| NR | New Radio |
| NTN | Non-Terrestrial Networks |
| RSRP | Reference Signals Received Power |
| SIB | System Information Block |
| SSB | Synchronization Signal Block |
| TA | Timing Advance |
| UE | User Equipment |

We claim:

1. An apparatus, comprising:
at least one processor; and
at least one memory comprising computer program code,
the at least one memory and the computer program code are configured, with the at least one processor, to cause the apparatus at least to
receive, from a network element, information comprising a coupling loss change between the apparatus and the network element when the network element is at first altitude and at a second altitude; and
control an uplink transmission based on the received information,
wherein during the controlling, the at least one memory and the computer program code are further configured, with the at least one processor, to cause the apparatus at least to receive, from the network element, a reduced transmit power command, and adjust transmit power in the uplink transmission based on the reduced transmit power command associated with a timing that is used when the uplink transmission is performed.

2. The apparatus according to claim 1, wherein the at least one memory and the computer program code are further configured, with the at least one processor, to cause the apparatus at least to:
receive a signal measurement from the network element; and
adjust an initial power reduction rate of the uplink transmission by estimating a path loss based on the received signal measurement.

3. The apparatus according to claim 1, wherein the at least one memory and the computer program code are further configured, with the at least one processor, to cause the apparatus at least to:
transmit to the network element a report comprising information of
whether a delayed transmission is selected,
an application type, and
a maximum allowed delay.

4. An apparatus, comprising:
at least one processor; and
at least one memory comprising computer program code, the at least one memory and the computer program code are configured, with the at least one processor, to cause the apparatus at least to
receive, from a network element, information comprising a coupling loss change between the apparatus and the network element when the network element is at first altitude and at a second altitude; and
control an uplink transmission based on the received information,
wherein during the controlling, the at least one memory and the computer program code are further configured, with the at least one processor, to cause the apparatus at least to:
calculate, based on the coupling loss change, a transmit power level to achieve a current data rate in the uplink transmission;
adjust a transmit power in the uplink transmission based on the calculated transmit power level to maintain the current data rate; and
adjust a timing that is used when the uplink transmission is performed.

5. A method, comprising:
receiving, from a network element, information comprising a coupling loss change between a user equipment and the network element when the network element is at a first altitude and at a second altitude; and
controlling an uplink transmission based on the received information,
wherein during the controlling, the method comprises receiving, from the network element, a reduced transmit power command, and adjusting transmit power in the uplink transmission based on the reduced transmit power command associated with a timing that is used when the uplink transmission is performed.

6. The method according to claim 5, further comprising:
receiving a signal measurement from the network element; and
adjusting an initial power reduction rate of the uplink transmission by estimating a path loss based on the received signal measurement.

7. The method according to claim 5, further comprising:
transmitting to the network element a report comprising information of
whether a delayed transmission is selected,
an application type, and
a maximum allowed delay.

8. A method, comprising:
receiving, from a network element, information comprising a coupling loss change between a user equipment and the network element when the network element is at a first altitude and at a second altitude; and
controlling an uplink transmission based on the received information,
wherein during the controlling, the method comprises:
calculating, based on the coupling loss change, a transmit power level to achieve a current data rate in the uplink transmission;
adjusting a transmit power in the uplink transmission based on the calculated transmit power level to maintain the current data rate; and
adjusting a timing that is used when the uplink transmission is performed.

9. A method, comprising:
receiving, from a user equipment, a report comprising status information;
determining a transmit timing and a transmit power based on the report to achieve a current data rate;
controlling a downlink transmission based on the transmit timing and the transmit power; and
estimating a coupling loss between an aerial base station (or an aerial node or station) and the user equipment at a future altitude based on a current elevation angle of the apparatus and a current coupling loss between the apparatus and the user equipment.

10. The method according to claim 9, wherein the status information comprises:
whether delayed transmission is selected by the user equipment,
an application type used by the user equipment, and
a maximum allowed delay reported by the user equipment.

11. The method according to claim 10, wherein in determining the transmit timing, the method comprises:
considering the maximum allowed delay reported by the user equipment.

12. A method, comprising:
receiving, from a user equipment, a report comprising status information;
determining a transmit timing and a transmit power based on the report to achieve a current data rate; and
controlling a downlink transmission based on the transmit timing and the transmit power,
wherein in determining the transmit power, the method comprises:
estimating, based on the report and a timing advance value of the user equipment, a clutter loss and an elevation angle of the user equipment; and
calculating a coupling loss change based on the clutter loss and the elevation angle.

* * * * *